J. F. JONES.
SACK BALER.
APPLICATION FILED MAR. 20, 1917.

1,249,109.

Patented Dec. 4, 1917.
2 SHEETS—SHEET 1.

WITNESSES

INVENTOR
J. F. Jones,
BY Victor J. Evans
ATTORNEY

J. F. JONES.
SACK BALER.
APPLICATION FILED MAR. 20, 1917.

1,249,109.

Patented Dec. 4, 1917.
2 SHEETS—SHEET 2.

WITNESSES

INVENTOR
J. F. Jones,
BY Victor J. Evans
ATTORNEY

UNITED STATES PATENT OFFICE.

JAMES FLOYD JONES, OF MONETA, IOWA, ASSIGNOR OF ONE-HALF TO FLOETE LUMBER COMPANY, OF SPENCER, IOWA, A CORPORATION OF IOWA.

SACK-BALER.

1,249,109.  Specification of Letters Patent.  Patented Dec. 4, 1917.

Application filed March 20, 1917. Serial No. 156,082.

*To all whom it may concern:*

Be it known that I, JAMES F. JONES, a citizen of the United States, residing at Moneta, in the county of O'Brien and State of Iowa, have invented new and useful Improvements in Sack-Balers, of which the following is a specification.

This invention is an improved sack baler for baling or arranging in bundles, sacks such as cement sacks, or grain sacks, after they have been emptied and for shipment back to the mill or factory, the object of the invention being to provide an improved machine of this character which is extremely cheap and simple, is strong and durable, which is adapted to be operated manually, and by means of which empty sacks may be expeditiously arranged in bundles for shipment.

Another object of the invention is to provide an improved sack baler of this character which also passes the baling wires around the bale or bundle while the bale or bundle is being formed and greatly facilitates the fastening of the wires around the bale or bundle.

With the above and other objects in view the invention consists in the construction, combination and arrangement of devices hereinafter described and claimed.

In the accompanying drawings:—

Figure 1:
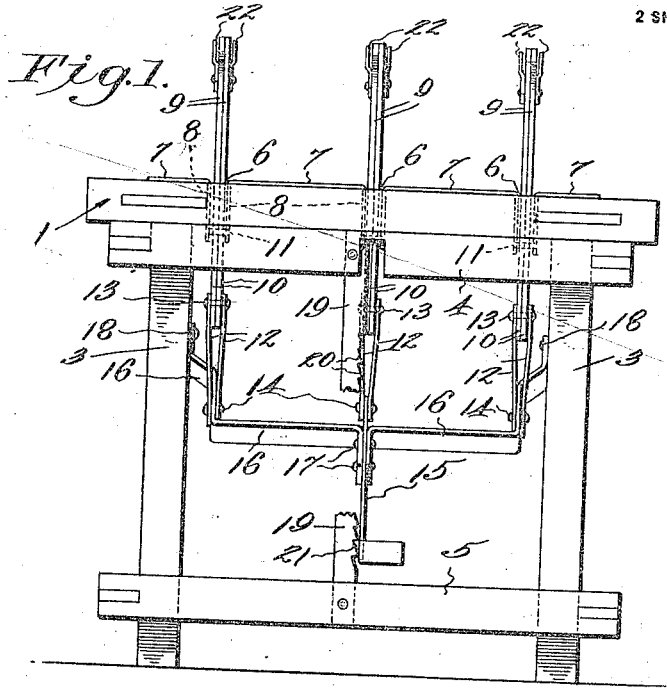
Figure 1 is a front elevation of a sack baler constructed and arranged in accordance with my invention and showing the compressing and binding arms in the position assumed thereby when forming a bale or bundle.
Figure 2:
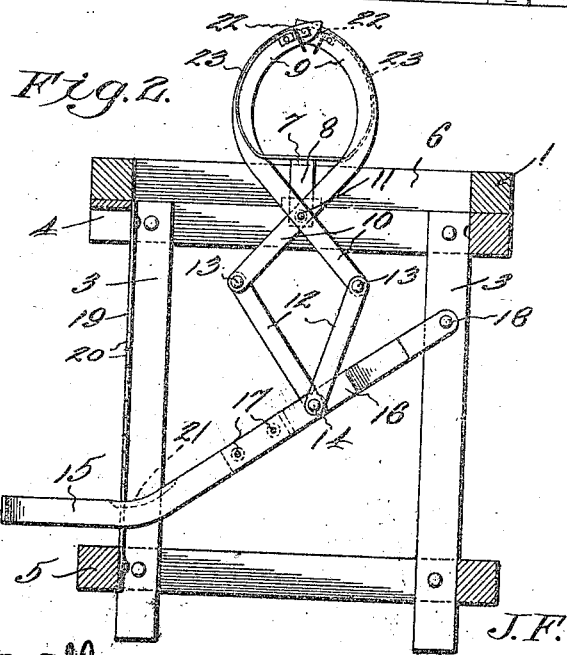
Fig. 2 is a vertical transverse sectional view of the same in the same position.
Figure 3:
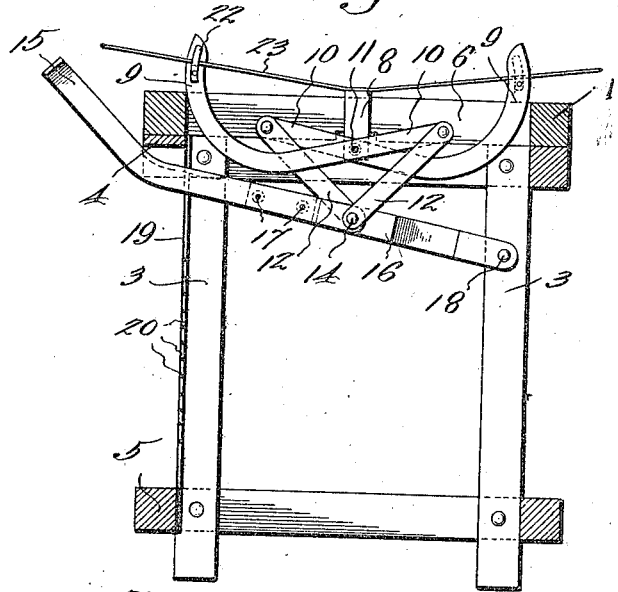
Fig. 3 is a similar view of the same with the compressing and binding arms in lowered open position.
Figure 4:
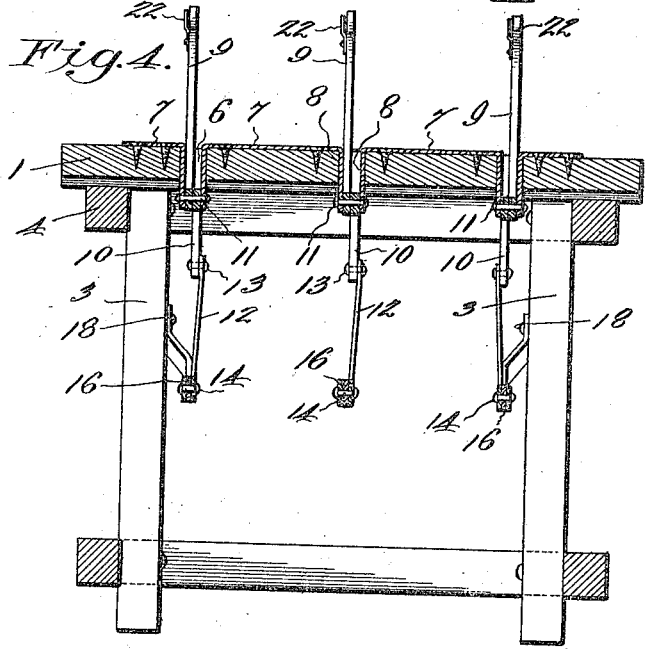
Fig. 4 is a detailed longitudinal sectional view.

In the embodiment of my invention I provide a table 1 which is here shown as having a supporting frame comprising legs 3 and upper and lower bars 4, 5 which connect the legs together and serve to strengthen the construction of the frame. The table is provided with transverse slots 6, three of said slots being here shown, one midway between the ends of the table and the others midway between the center slots and the ends of the table. Longitudinal irons 7 are secured on the center of the table and are provided with depending hanger arms 8 arranged in opposite sides of said slots and extending a suitable distance below the table top.

A pair of oppositely arranged compressing and binding arms 9 are arranged for movement in each slot and are provided with downwardly extending cross lever arms 10 which are pivotally mounted on bolts 11 which connect the hangers in pairs.

A link 12 is pivotally connected as at 13 to each lever arm and the said links have their lower ends pivotally connected as at 14 to a lever 15 said lever being provided with fork arms 16 which are bolted thereto as at 17 and are pivotally mounted as at 18 on the inner sides of the two rear supporting legs of the table. A vertically arranged bar 19 is secured to the front upper bar 4 and lower bar 5 of the table and has ratchet teeth 20 on one side, any one of which may be engaged by a locking lip 21 with which the lever is provided, to secure the lever and the compressing and binding arms with the said arms in either open or closed position.

It will be observed that the crossed lever portions of said compressing and binding arms and the operating links and lever therefor and also the ratchet bar are arranged below the table so that the table top is unobstructed excepting by the compressing and binding arms and when said compressing and binding arms are open the central portion of the table is entirely unobstructed. This very greatly facilitates the placing of the sacks to be baled or bundled, on the table and the removal of the baled or bundled sacks from the table.

Each compressing and binding arm is provided near its free upper or outer end and on one side with a wire carrier 22, said wire carriers serving to hold the ends of the binding wires 23 and to pass the binding wires around the bale or bundle at the same time that the bale or bundle is formed by the binding and compressing arms. While the compressing and binding arms are in closed, bale or bundle forming position, the ends of the binding wires are twisted together by the operator, thus completing the formation and securing of the bale or bundle so that when the compressing and binding arms are then opened to release the bale or bundle the latter may be removed from the table in a completed condition.

While I have herein shown and described a preferred form of my invention I would have it understood that changes may be made in the form, proportion and construction of the several parts, without departing from the spirit of my invention and within the scope of the appended claim.

Having thus described my invention, what I claim is:—

A baler of the class described comprising a table having a transverse slot, longitudinal irons on the table and having downwardly extending hanger arms arranged at the sides of the slot and extending below the table, a pivot connecting the hanger arms, a pair of compressing and binding arms mounted on the pivot and arranged for movement in the slot and above the table toward and from each other, and operating means for said arms and arranged below the table.

In testimony whereof I affix my signature.

JAMES FLOYD JONES.